United States Patent Office 3,288,193
Patented Nov. 29, 1966

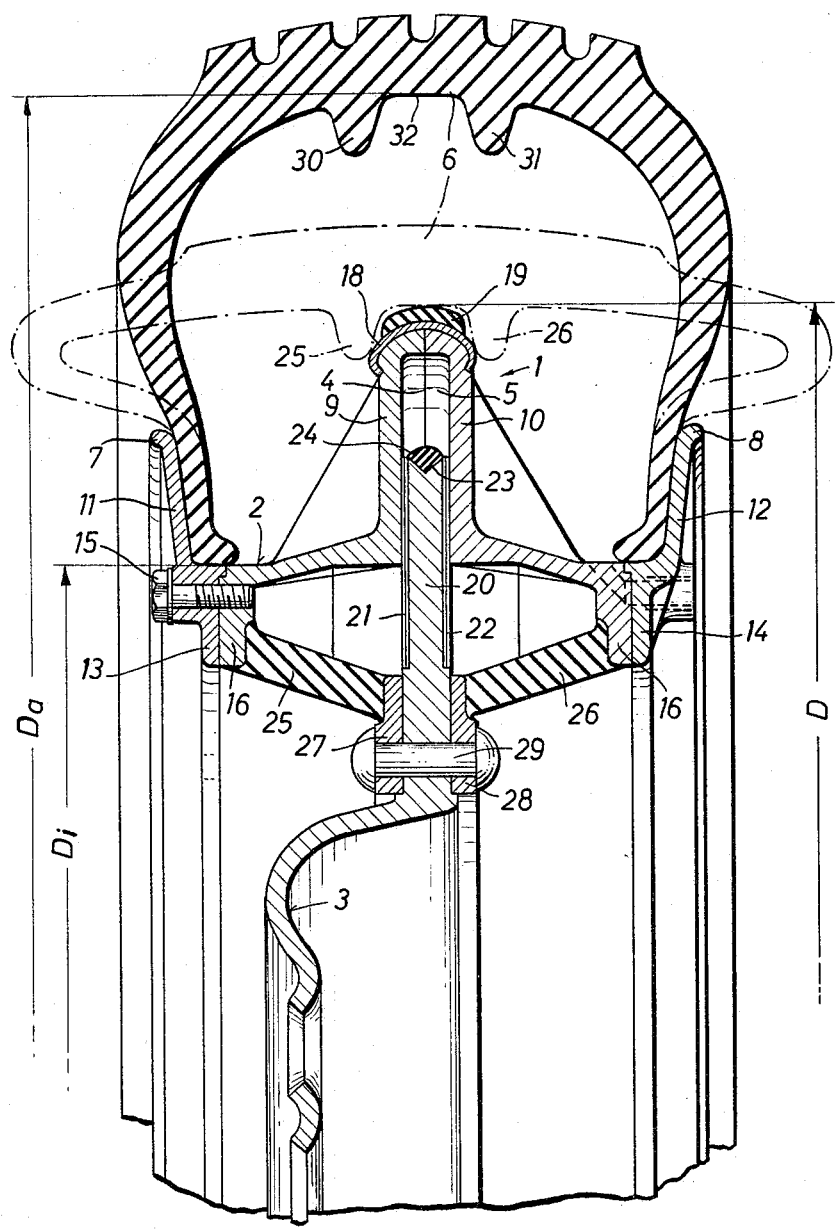

3,288,193
VEHICLE WHEEL
Albrecht Wolfgang Mantzel, Ingolstadt (Danube), Germany, assignor to Inpaco Trust Reg., Vaduz, Liechtenstein
Filed July 7, 1965, Ser. No. 470,081
Claims priority, application Germany, July 10, 1964,
J 26,186
18 Claims. (Cl. 152—49)

The present invention refers to improvements in or relating to tire-equipped wheels of vehicles, and more particularly refers to such wheels wherein elastic means are provided for interconnecting the drop base rim or felloe with the wheel disk.

Felloes wherein for improving the driving quality of the vehicle the drop base is elastically supported by the wheel disk, are known, but therein certain difficulties are encountered in duly stabilizing sideways to one another the parts of the wheel. In general, laterally stabilizing means are provided for, but the known arrangements are of excessive disturbing dimensions. Thus, particularly in the case of small felloes, the desired elastic support between the drop base and the wheel disk can not be performed or with considerable difficulties only.

The invention aims at proposing a felloe construction and arrangement suitable for small tire-equipped wheels, wherein the laterally stabilizing means do not require any special space and whereby the safety in case of a tire defect is increased.

For the purpose set forth, the main object of the present invention is to provide an improved tire-equipped wheel for vehicles, having the drop base rim and the wheel disk interconnected by elastic means, characterized in that for providing laterally stabilizing means said drop base rim along its middle plane perpendicular to the wheel axis forms a deep annular guide groove and the wheel disk includes a peripherical extension engaging said guide groove, this wheel disk extension and the drop base portions forming said guide groove projecting into the tire chamber.

By virtue of this particular arrangement of the laterally stabilizing means within the tire chamber it is rendered possible to elastically support the felloe and the tire in deflated condition.

It is particularly advantageous to give the said laterally stabilizing means a diameter exceeding the diameter of the rim flanges, e.g. a diameter D according to the following equation $$D = \frac{D_a + D_i}{2}$$

wherein $D_a$ is the diameter of the inner wall of the tire tread portion and $D_i$ the outer diameter of the felloe. By virtue of this feature driving with a deflated tire may be continued without the risk of skidding, because the deflated tire does not completely collapse and does not tend to become cut by the rim flanges, but is efficiently supported along its centre plane perpendicular to the wheel axis, with the advantageous result that driving with a deflated and so supported tire may be indeed continued.

In order to avoid damaging of the inner wall of the tire tread portion in case of a deflated tire the said laterally stabilizing means include at least one elastic circumferential pad and said inner wall of the tire tread portion is provided with a pair of ring-shaped spaced apart ribs forming a groove capable of being engaged by said stabilizing means and thereby preventing the deflated tire from moving sideways on said stabilizing means.

For the purpose of facilitating the construction and assembling of the wheel, the invention proposes to divide the felloe along its middle plane perpendicular to the wheel axis into two halves which are interconnected by a double flanged clamp ring engaging the outer edges of the felloe portions forming the afore-mentioned guide groove and carrying one of the said elastic pad. Another pad is advantageously provided on the circumference of the peripherical ring-shaped extension of the wheel disk, this second pad advantageous insofar as it is capable of absorbing hard blows often produced in the elastic suspension of motorcars by road unevenness.

The said peripherical ring-shaped extension of the wheel disk engages the said guide groove formed by the felloe and during driving there is a sliding contact between said extension and the inner walls of said guide groove. In order to avoid friction, damage and noise, the side walls of said ring-shaped extension or of said guide groove are advantageously provided with antifriction coatings e.g. of graphitic hardboard.

Another characteristic feature of the invention has to be seen in the provision of elastic cylindrical, preferably cone-shaped support members of rubber or synthetic material which at one edge engage a circumferential flange of the felloe and at the other edge engage a pair of ring members secured to the foot portion of the said peripherical ring-shaped extension of the wheel disk. The elastic cylindrical support members are readily moldable and provide for an efficient deadening of the rolling noise of the tires. The cone-shaped construction of the cylindrical support members provides for favourable conditions of forces insofar as the same are subject to shearing and tensile strain, and by means of a correspondingly elected axial prestress allows for exerting an influence on the development of the characteristic curve in a sense of elasticity. The provision of the circumferential flange of the felloe engaging one edge of the cylindrical cone-shaped support members and of the ring member engaging the other edge of said support members also facilitates manufacturing and assembling of the wheel parts.

In view of the fact that as herein before set forth the felloe or the felloe halves are provided with circumferential flange portions for engaging the elastic cylindrical cone-shaped support members, according to an additional feature of the invention separate rim flanges are provided for engaging and fixing in place the inner edge portions of the tire, said rim flanges including cylindrical inner portions capable of being connected by screws or like means to said circumferential flange portions of the felloe or felloe halves. By virtue of this feature, a further simplification in manufacturing the felloe is achieved, particularly insofar as pieces having two projecting flange portions may be manufactured only in several process steps.

Finally it has to be mentioned that if according to the invention the wheel disk immediately adjacent the foot portion of its peripherical ring-shaped extension is vaulted, a free space is provided for within the felloe capable of containing a brake drum, particularly of a disk brake.

By way of example only, a preferred embodiment of the tire-equipped wheel incorporating the improvements according to the invention is illustrated in the accompanying drawing showing the improved wheel in a fragmentary sectional view.

Having reference to the drawing, the felloe 1 comprise a drop base rim 2 connected to a wheel disk 3. The drop base rim 2 is subdivided along its middle plane 4 perpendicular to the wheel axis and comprises outwardly projecting opposite felloe portions 9 and 10 so constructed a deep annular guide groove 5 is formed between the same. The felloe portions 9 and 10 extend centrally into the chamber of the tire 6 and their inwardly bent edge portions abut one another on the plane 4, the top formed by the bent edge portions being situated at a level far beyond the level of the outer edges 7 and 8 of two rim flanges 11 and 12, respectively serving for engaging the edge portions of the tire 6. The rim flanges 11 and 12 provided as separate members have their base portions 13 and 14, respectively, secured as per screws 15 to a flange 16 of the drop base rim 2. In one of the base portions 13 or 14 bore 16 is provided for the tire valve (not shown).

The felloe portions 9 and 10 at their inwardly bent edge portions are firmly held together by a double flanged clamp ring 18 provided with a ring-shaped elastic cover or pad 19 and serving as a support for the tire 6 in deflated condition shown in dot-and-dash lines.

The wheel disk 3, for the reason set forth, is bent or vaulted as shown and comprises as integral part thereof a peripheral ring-shaped extension 20 the side walls of which are provided with antifriction coatings 21 and 22 of e.g., graphitic hardboard. The thickness of the disk-like extension 20 together with its coatings 21 and 22 is equal the width of the groove 5. If desired the antifriction coatings may also be provided on the inner walls of the felloe portions 9 and 10. The circumference of the extension 20 is formed with a groove 23 serving for securing in place a ring-shaped elastic pad 24.

The felloe 1 and the wheel disk 3 are elastically interconnected by a pair of slightly tapered elastic cylinders 25 and 26 of rubber or a synthetic material secured in place by engagement or connection of their outer edges with the flange 16 of the drop base rim 2 and of their inner edges with washers 27 and 28, respectively, which are secured to the foot of the disk-like extension 20 as by rivets 29, bolts or the like.

The tire 6 on the inner wall of its tread portion is provided with a pair of spaced apart ring-shaped ribs 30, 31 forming a groove 32 the width of which is sufficient for receiving the top of the support 9–10–18–19, the depth of the groove 32 being sufficient for an efficient engagement by said support enabling the latter to retain the deflated tire in its position shown in dot-and-dash lines.

What is claimed is:

1. A tire-equipped wheel for vehicles comprising a tire, a tire-chamber therein, a wheel disk and a drop base rim connected to the wheel disk by elastic means, the drop base rim being provided with a deep annular guide groove which lies in the center plane of the drop base rim perpendicular to the axis of the wheel, the wall-portions of the drop base rim forming said guide groove projecting outwardly into said tire-chamber, and the wheel disk being provided with a peripherical annular extension engaging said guide groove of said drop base rim.

2. A tire-equipped wheel for vehicles comprising a tire, a tire-chamber therein, a wheel disk and a drop base rim connected to the wheel disk by elastic means, the drop base rim being divided along the center plane of the wheel perpendicular to the wheel axis into two halves each halve of the drop base rim being provided with a flange projecting outwardly into the tire-chamber, the flanges being arranged in spaced relation symmetrical to the center plane of the wheel and providing an annular guide groove, the free edges of said flanges being bent towards each other and being arranged in abutting relation, and the wheel disk being provided with a peripherical annular extension engaging said guide groove.

3. A tire-equipped wheel for vehicles comprising a tire, a tire-chamber therein, a wheel disk and a drop base rim connected to the wheel disk by elastic means, the drop base rim being divided along the center plane of the wheel perpendicular to the wheel axis into two halves each halve of the drop base rim being provided with a flange projecting outwardly into the tire-chamber, the flanges being arranged in spaced relation symmetrical to the center plane of the wheel and providing an annular guide groove, the free edges of said flanges being bent towards each other and being arranged in abutting relation, said abutting edges of the outwardly projecting flanges of the drop base rim being held together by a double-flanged clamp ring, an elastic annular pad being arranged on the peripheral outside of the clamp ring, and the wheel disk being provided with a peripherical annular extension engaging said guide groove.

4. A tire-equipped wheel for vehicles comprising a tire, a tire-chamber therein, a wheel disk and a drop base rim connected to the wheel disk by elastic means, the drop base rim being divided along the center plane of the wheel perpendicular to the wheel axis into two halves each halve of the drop base rim being provided with a flange projecting outwardly into the tire-chamber, the flanges being arranged in spaced relation symmetrical to the center plane of the wheel and providing an annular guide groove, the free edges of said flanges being bent towards each other and being arranged in abutting relation, the wheel disk being provided with a peripherical annular extension engaging said guide groove, the drop base rim halves being provided at their side edges opposite to the outwardly projecting flanges with inwardly projecting circumferential flanges, and rim flange members being arranged in side by side abutting relation to said inwardly projecting flanges and being removably secured thereto as by screws.

5. A tire-equipped wheel for vehicles as set forth in claim 4, wherein the outer diameters of the outwardly projecting flanges of the drop base rim are substantially larger than the outer diameters of the said separate rim flange members.

6. A tire-equipped wheel for vehicles comprising a tire, a tire-chamber therein, a wheel disk and a drop base rim connected to the wheel disk by elastic means, the drop base rim being divided along the center plane of the wheel perpendicular to the wheel axis into two halves each halve of the drop base rim being provided with a flange projecting outwardly into the tire-chamber, the flanges being arranged in spaced relation symmetrical to the center plane of the wheel and providing an annular guide groove, the free edges of said flanges being bent towards each other and being arranged in abutting relation, said abutting edges of the outwardly projecting flanges of the drop base rim being held together by a double flanged clamp ring, an elastic annular pad being arranged on the peripheral outside of the clamp ring, and the wheel disk being provided with a peripheral annular extension engaging said guide groove, the drop base rim halves being provided at their side edges opposite to the outwardly projecting flanges with inwardly projecting circumferential flanges and rim flange members being arranged in side by side abutting relation to said inwardly projecting flanges and being removably secured thereto as by screws, the outer diameters of the outwardly projecting flanges of the drop base rim being substantially greater than the outer diameters of said separate rim flange members.

7. A tire-equipped wheel for vehicles comprising a tire, a tire-chamber therein, a wheel disk and a drop base rim connected to the wheel disk by plastic means, the drop base rim being provided with a deep annular guide groove which lies in the center plane of the drop base rim perpendicular to the axis of the wheel, the wall portions of the drop base rim forming said guide groove projecting outwardly into said tire-chamber, the wheel disk being provided with a peripherical annular extension engaging said guide groove of said drop base rim, and the outer diameter of said guide groove forming wall-portions corresponding to the equation $$D=\frac{D_a+D_i}{2}$$

wherein D is the outer diameter of said wall-portions, $D_a$ is the inner diameter of the tread portion of the inflated tire and $D_i$ is the outer diameter of the drop base rim.

8. A tire equipped wheel for vehicles comprising a tire, a tire-chamber therein, a wheel disk and a drop base rim connected to the wheel disk by elastic means, the drop base rim being provided with a deep annular guide groove which lies in the center plane of the drop base rim perpendicular to the axis of the wheel, the wall-portions of the drop base rim forming said guide groove projecting outwardly into said tire-chamber, and the wheel disk being provided with a peripherical annular extension engaging said guide groove of said drop base rim, the extension of the wheel disk being provided with a circumferential groove and an elastic ring-shaped pad being arranged in said groove and secured therein.

9. A tire-equipped wheel for vehicles comprising a tire, a tire-chamber therein, a wheel disk and a drop base rim connected to the wheel disk by elastic means, the drop base rim being provided with a deep annular guide groove which lies in the center plane of the drop base rim perpendicular to the axis of the wheel, the wall-portions of the drop base rim forming said guide groove projecting outwardly into said tire-chamber, and the wheel disk being provided with a peripherical annular extension engaging said guide groove of said drop base rim, the peripherical extension of the wheel disk having its sidewalls provided with anti-friction coatings.

10. A tire-equipped wheel for vehicles comprising a tire, a tire-chamber therein, a wheel disk and a drop base rim connected to the wheel disk by elastic means, the drop base rim being provided with a deep annular guide groove which lies in the center plane of the drop base rim perpendicular to the axis of the wheel, the wall-portions of the drop base rim forming said guide groove projecting outwardly into said tire-chamber, and the wheel disk being provided with a peripherical annular extension engaging said guide groove of said drop base rim, the inner opposite sides of said guide groove forming wall-portions being provided with anti-friction linings.

11. A tire-equipped wheel for vehicles comprising a tire, a tire-chamber therein, a wheel disk and a drop base rim connected to the wheel disk by elastic means, the drop base rim being divided along the center plane of the wheel perpendicular to the wheel axis into two halves each half of the drop base rim being provided with a flange projecting outwardly into the tire-chamber, the flanges being arranged in spaced relation symmetrical to the center plane of the wheel and providing an annular guide groove, the free edges of said flanges being bent towards each other and being arranged in abutting relation, and the wheel disk being provided with a peripherical annular extension engaging said guide groove, said extension of said wheel disk being provided at its outer edge with a circumferential groove and an elastic ring-shaped pad being arranged in said last named groove and secured therein.

12. A tire-equipped wheel for vehicles as set forth in claim 11, wherein the opposite sides of said extension of the wheel disk are provided with anti-friction coatings.

13. A tire-equipped wheel for vehicles as set forth in claim 11, wherein the opposite inner side portions of said outwardly projecting flanges of said drop base rim are provided with anti-friction linings.

14. A tire-equipped wheel for vehicles comprising a tire, a tire-chamber therein, a wheel disk and a drop base rim connected to the wheel disk by a pair of cylindrical slightly tapered support members made of an elastic material, said support members being secured with their outer edges to flanges projecting inwardly from said drop base rim and with their inner edges to a pair of annular members, which in turn are secured to the wheel disk, the drop base rim being divided along the center plane of the wheel perpendicular to the wheel axis into two halves each half of the drop base rim being provided with a flange projecting outwardly into the tire-chamber, the flanges being arranged in spaced relation symmetrical to the center plane of the wheel and providing an annular guide groove, the free edges of said flanges being bent towards each other and being arranged in abutting relation, and the wheel disk being provided with a peripherical annular extension engaging said guide groove.

15. A tire-equipped wheel for vehicles as set forth in claim 14, wherein the wheel disk between said peripherical extension thereof and the hub of the wheel is vaulted for accommodation of a brake drum.

16. A tire-equipped wheel for vehicles comprising a tire, a tire-chamber therein, a wheel disk and a drop base rim connected to the wheel disk by elastic means, the drop base rim being provided with a deep annular guide groove which lies in the center plane of the drop base rim perpendicular to the axis of the wheel, the wall-portions of the drop base rim forming said guide groove projecting outwardly into said tire-chamber, and the wheel disk being provided with a peripherical annular extension engaging said guide groove of said drop base rim, the inner wall of the tread portion of the tire being provided with a pair of ring-shaped spaced apart ribs forming an annular groove opposite to the said guide groove forming wall-portions of the drop base rim for engagement therewith when the tire is deflated.

17. A tire-equipped wheel for vehicles comprising a tire, a tire-chamber therein, a wheel disk and a drop base rim connected to the wheel disk by elastic means, the drop base rim being divided along the center plane of the wheel perpendicular to the wheel axis into two halves each half of the drop base rim being provided with a flange projecting outwardly into the tire-chamber, the flanges being arranged in spaced relation symmetrical to the center plane of the wheel and providing an annular guide groove, the free edges of said flanges being bent towards each other and being arranged in abutting relation, said abutting edges of the outwardly projecting flanges of the drop base rim being held together by a double flanged clamp ring, an elastic annular pad being arranged on the peripherical outside of the clamp ring, and the wheel disk being provided with a peripherical annular extension engaging said guide groove, the inner wall of the tread portion of the tire being provided with a pair of ring-shaped spaced apart ribs forming an annular groove therebetween opposite to the outwardly projecting flanges of the drop base rim for engagement therewith when the tire is deflated.

18. A tire-equipped wheel as set forth in claim 17, wherein said groove formed between the ribs on the inner wall-portion of the tire is of such a width and depth that its engagement by the top of the said outwardly projecting flanges of the drop base rim by engagement with said groove prevents the deflated tire from skidding sideways.

No references cited.

ARTHUR L. LA POINT, *Primary Examiner.*

C. W. HAEFELE, *Assistant Examiner.*